United States Patent [19]

Diaz

[11] 3,986,917

[45] Oct. 19, 1976

[54] APPARATUS FOR FABRICATING BOLSTERS

[76] Inventor: Lorenzo Diaz, 10943 SW. 4th St., Miami, Fla. 33174

[22] Filed: July 3, 1974

[21] Appl. No.: 485,373

[52] U.S. Cl. .................................... 156/443; 93/52; 156/211; 156/217; 156/510; 156/578; 428/126

[51] Int. Cl.² ........................ B26D 3/08; B32B 3/04

[58] Field of Search .......... 93/36 MM, 37 R, 37 SP, 93/49 R, 52; 156/211, 443, 475, 493, 257, 268, 202, 216, 217, 510, 578; 428/126

[56] References Cited

UNITED STATES PATENTS

| | | | |
|---|---|---|---|
| 1,609,320 | 12/1926 | Smith | 156/216 X |
| 2,664,035 | 12/1953 | Roselius | 93/49 R |
| 2,788,835 | 4/1957 | Brookes et al. | 156/72 |
| 3,170,832 | 2/1965 | Wilson et al. | 161/119 |
| 3,398,660 | 8/1968 | Watrous | 93/49 R |
| 3,398,661 | 8/1968 | Mathes et al. | 93/52 |
| 3,550,509 | 12/1970 | Mittermayer | 93/36 MM |
| 3,652,080 | 3/1972 | Jenkins | 270/61 R |
| 3,677,144 | 7/1972 | Hudson | 93/52 X |
| 3,756,894 | 9/1973 | Shugart | 93/52 X |
| 3,808,958 | 5/1974 | Keener et al. | 93/49 R |

*Primary Examiner*—Harold Ansher
*Assistant Examiner*—Henry F. Epstein
*Attorney, Agent, or Firm*—Edward R. Weingram

[57] ABSTRACT

Apparatus for manufacturing bolsters used to form the core for fabric windings includes apparatus to apply glue to specific areas of pre-sized cardboard cards, crimp the cards at specific locations to produce edges for the finished product, fold the crimped card, and compress the card to insure proper adhesion of the edges to the surfaces they contact, to form the finished bolster. The bolsters are produced by a method of passing a pre-sized cardboard card through the steps of gluing, crimping, folding and compressing, to provide a finished bolster of any predetermined length. A bolster is produced from a cardboard card of sufficient stiffness to provide for a substantially hollow construction, other than for a central stiffening spline used to determine the height of the bolster and provide rigidity to the bolster.

9 Claims, 17 Drawing Figures

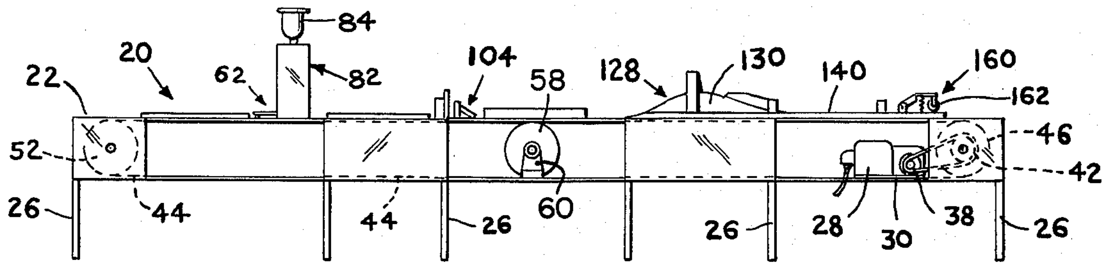
FIG. 1
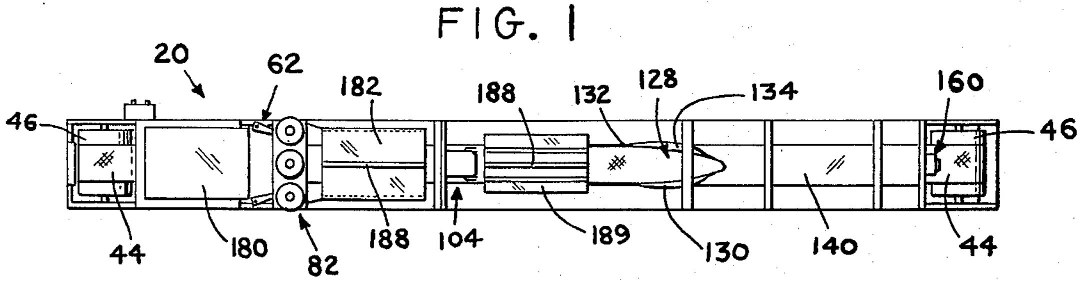
FIG. 2
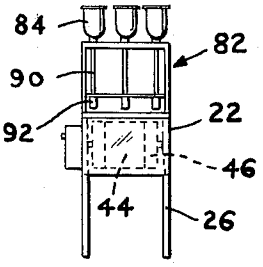
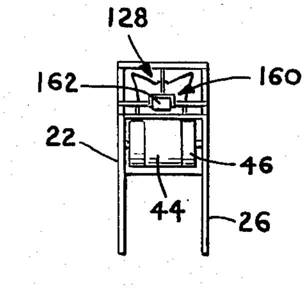
FIG. 3 FIG. 4
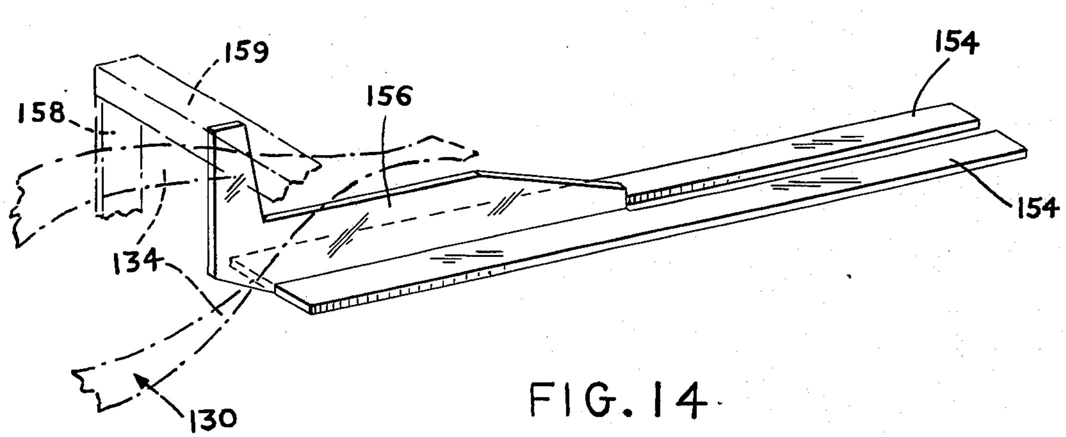
FIG. 14

FIG. 7B
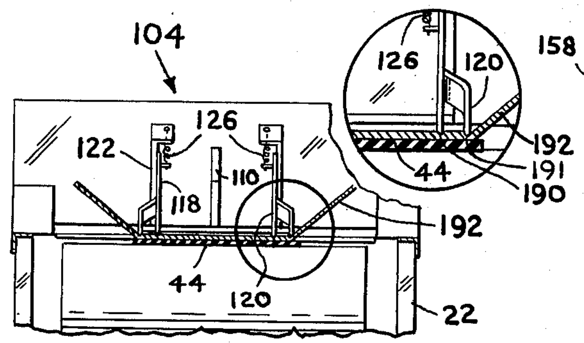
FIG. 7A
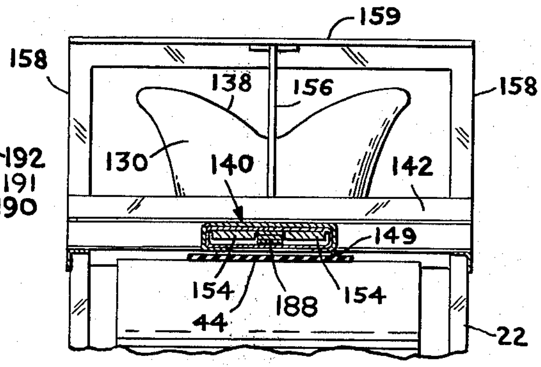
FIG. 8
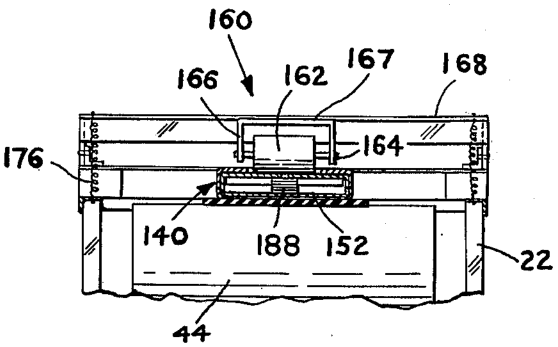
FIG. 9
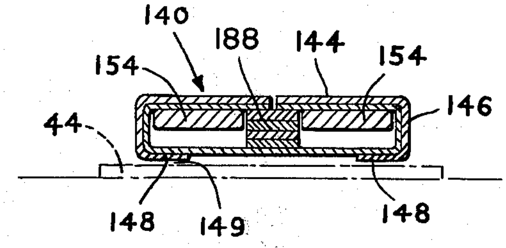
FIG. 10
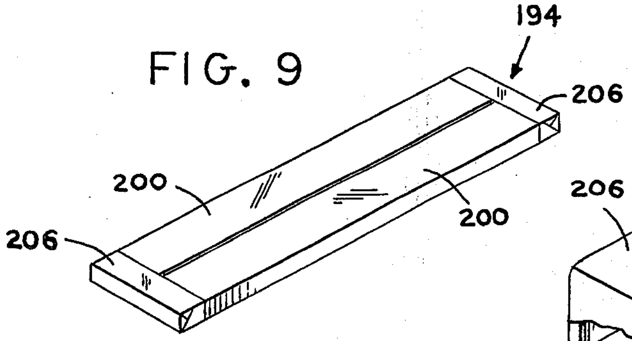
FIG. 11
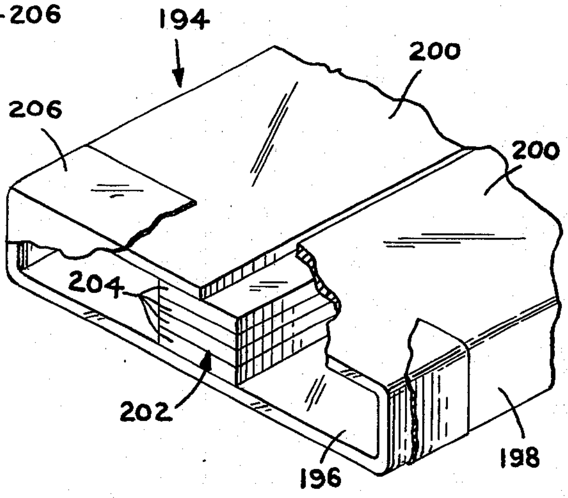
FIG. 12
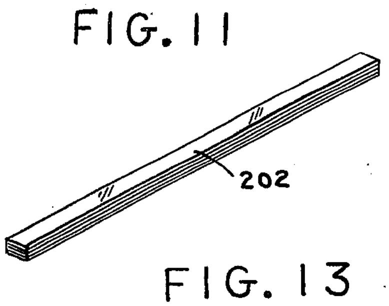
FIG. 13

APPARATUS FOR FABRICATING BOLSTERS

BACKGROUND OF THE INVENTION

1. Field of the Invention

This invention relates to the formation of heavy cardboard-type products and equipment therefor and, specifically, to apparatus and method for forming bolsters for use in winding lengths of fabric.

2. Description of the Prior Art

Bolsters used as cores for the winding of fabric materials have wide application in the production and storing of fabrics. Because the quantity of the bolsters required by the industry is very great, the cost associated with the production of bolsters and the ease with which they are made is an important factor in the economics of the industry. Many different types of bolsters have been produced, often with the use of complex, intricate and expensive machinery which is subject to breakdown or poor performance because of minor adjustment requirements. Further, these machines often require highly specialized, custom-fabricated raw materials to be used in the manufacturing of bolsters.

Also, the fabrication process of the machine is often a lengthy, intricate process in which the dimensions of the material used must be critically controlled and are subject to variations which disable the manufacturing process or render the manufacturing process inoperative or unreliable. Further, the bolsters produced are often less than satisfactory because of variations in their dimension, and because they cannot be made by a rapid manufacturing process with sufficient rigidity to provide extended service life necessary for economical use. Additionally, bolsters often must be produced in standard stock sizes to accommodate the limitations of the complex machinery which produces them.

SUMMARY OF THE INVENTION

In order to overcome the disadvantages of the prior art, the applicant provides a simplified method and apparatus for producing bolsters for use as cores in the winding of fabric. The apparatus utilizes precut flat cards or blanks of cardboard, and provides means for applying glue to specific, predetermined areas of the card, crimping the card to form the surfaces of the finished bolster, folding portions of the card to form the surfaces, compressing the folded card to the outer dimensions of the finished product, and adhering the glued surfaces to bare surfaces to insure the affixing of the various segments of the bolster in the finished position.

A simplified method of forming the bolsters is also provided, in which applicant passes a presized card or blank of cardboard along a path of travel in which the card is aligned, adhesive is applied to portions of the card, the card is crimped, folded, compressed, and the segments adhered to form the finished bolster.

Applicant also provides a bolster of simplified shape and construction using relatively common corrugated-type cardboard to form a bolster which is substantially hollow, with only a central stiffening spline necessary to provide the structural rigidity necessary for the bolster to fulfill its intended function.

Accordingly, in view of the above, it is an object of the present invention to provide apparatus for fabricating bolsters, which is relatively simple.

Another object of the present invention is to provide apparatus for constructing bolsters which can be constructed relatively inexpensively.

It is still another object of the present invention to provide apparatus for constructing bolsters which is reliable in operation.

Yet another object of the present invention is to provide apparatus for constructing bolsters which can make bolsters of varying lengths.

It is a further object of the present invention to provide apparatus for constructing bolsters which can manufacture bolsters from relatively simple and easily obtained materials.

An additional object of the present invention is to provide apparatus for constructing bolsters which can use materials having relatively wide variations in dimensions.

It is another object of the present invention to provide apparatus for constructing bolsters which produces bolsters of uniform dimension regardless of relatively wide variations in material.

Still another object of the present invention is to provide apparatus for constructing bolsters which is durable and not subject to breakdown during operation.

It is yet another object of the present invention to provide apparatus for constructing bolsters which has relatively few moving parts.

A further object of the present invention is to provide apparatus for constructing bolsters which can easily be serviced.

Additionally, another object of the present invention is to provide a method for manufacturing bolsters which has relatively few steps.

It is a further object of the present invention to provide a method for manufacturing bolsters which does not require highly automated and interrelated process operations.

Another object of the present invention is to provide a method for manufacturing bolsters which can utilize materials of relatively wide variations in size.

It is still another object of the present invention to provide a method for manufacturing bolsters which can produce bolsters of various lengths.

Yet another object of the present invention is to provide a method for manufacturing bolsters which can easily be monitored.

It is a further object of the present invention to provide a method for manufacturing bolsters which is adaptable for installation in relatively small plants.

An additional object of the present invention is to provide a bolster for use as a core for winding textile fabrics, which is of simplified construction.

It is another object of the present invention to provide a bolster for use as a core for winding textile fabrics, which can be made from relatively common and easily obtained materials.

Still another object of the present invention is to provide a bolster for use as a core for winding textile fabrics, which can be made of materials having relatively wide variations in size.

It is yet another object of the present invention to provide a bolster for use as a core for winding textile fabrics, which is relatively inexpensive.

A further object of the present invention is to provide a bolster for use as a core for winding textile fabrics which is relatively durable.

It is an added object of the present invention to provide a bolster for use as a core for winding textile fabrics which has a minimum of components.

Also, another object of the present invention is to provide a bolster for use as a core for winding textile fabrics, which does not utilize any specialized materials.

It is another object of the present invention to provide a bolster for use as a core for winding textile fabrics, which is relatively easy to manufacture.

Still another object of the present invention is to provide a bolster for use as a core for winding textile fabrics, which is accurately dimensioned.

Other objects and advantages will be apparent from the following description of an embodiment of the invention, and the novel features will be particularly pointed out hereinafter in connection with the appended claims.

BRIEF DESCRIPTION OF THE DRAWINGS

FIG. 1 is a front elevational view of an apparatus for manufacturing bolsters, built in accordance with the teachings of the present invention.

FIG. 2 is a top elevation of the apparatus shown in FIG. 1.

FIG. 3 is a lefthand view of the apparatus shown in FIG. 1.

FIG. 4 is a righthand view of the apparatus shown in FIG. 1.

FIG. 7A is a view taken along line 7—7 of FIG. 5A.

FIG. 7B is an enlarged view of the encircled portion of FIG. 7A.

FIG. 8 is a view taken along line 8—8 of FIG. 5B.

FIG. 9 is a view taken along line 9—9 of FIG. 5B.

FIG. 10 is an enlarged cross-sectional view of the bolster prior to leaving the outlet of the bolster making machine.

FIG. 11 is a perspective view of a bolster built in accordance with the teachings of the present invention.

FIG. 12 is an enlarged view, partially broken away, of the end of the bolster shown in FIG. 10.

FIG. 13 is a view of the spline element of the bolster shown in FIG. 12.

FIG. 14 is a perspective view of the line guide of the apparatus.

DESCRIPTION OF THE PREFERRED EMBODIMENT

Figure 5A:
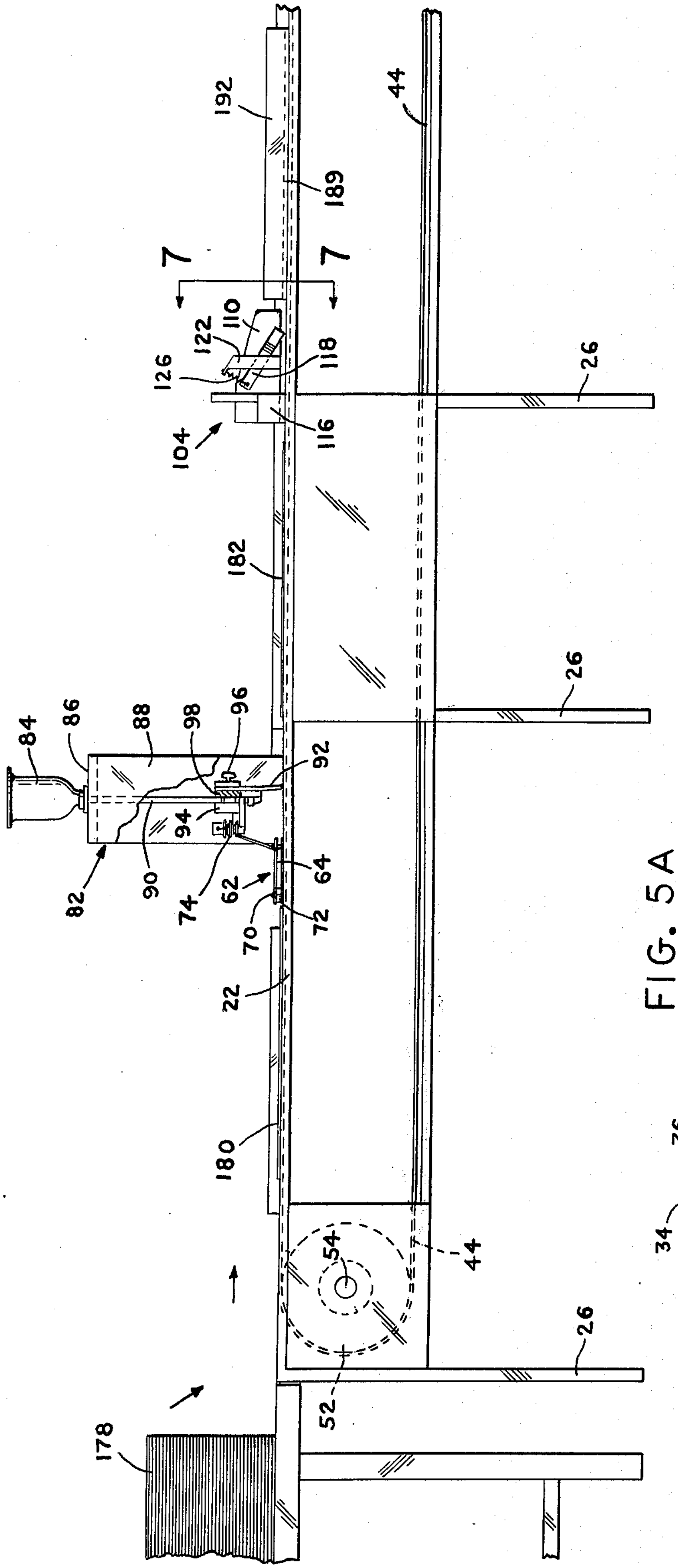
FIG. 5A is an enlarged view of the lefthand portion of FIG. 1.

The bolster making machine shown in FIGS. 1 through 10 includes a table, generally indicated at 20 having a frame 22 supported by legs 26 and with several conveyor support plates 24 extending horizontally between the side members of the frame 22. As shown in FIG. 5B, an electric motor 28 mounted on a mounting plate 30 is connected to the frame 24 by means of a plurality of bolts 32. The electric motor is controlled by control buttons 34 extending from control box 36 mounted on the frame as shown in FIG. 6A. A drive pulley 38 extending from the electric motor drives a driven pulley 42 by means of a drive belt 40, to power a drive roller 46 which moves a conveyor belt 44 the length of the table. The drive roller 46 is mounted by means of an axle 48 to a mount 50 on the table frame 22. The conveyor belt extends the length of the table and, as shown in FIG. 5A, is connected to a pick-up roller 52 mounted on axle 54 which is connected to mount 56 in the table frame 24. As shown in FIG. 1, a conveyor belt idler roller 58 is mounted by means of roller axle frame mount 60 at the mid point of the table to provide additional support for the conveyor belt.

Figure 6A:
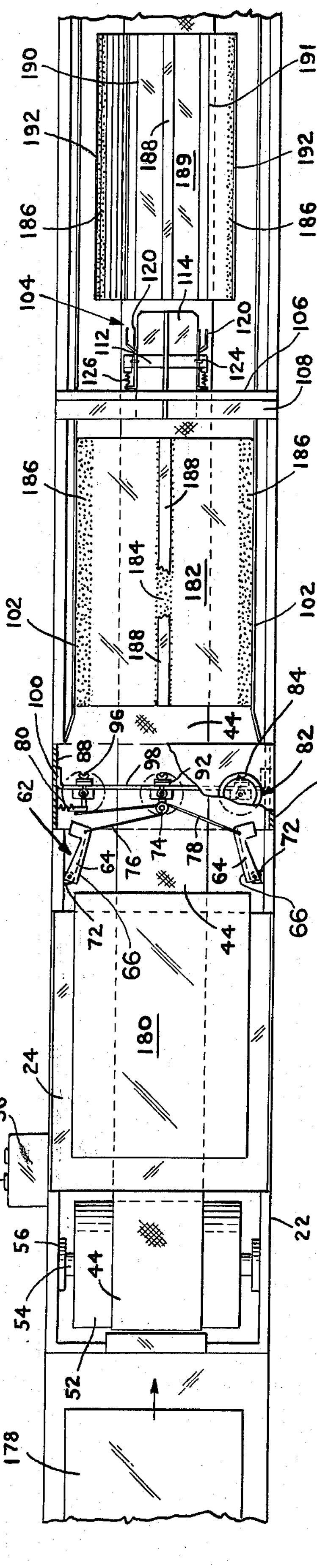
FIG. 6A is an enlarged view of the lefthand portion of FIG. 2.
Figure 5B:
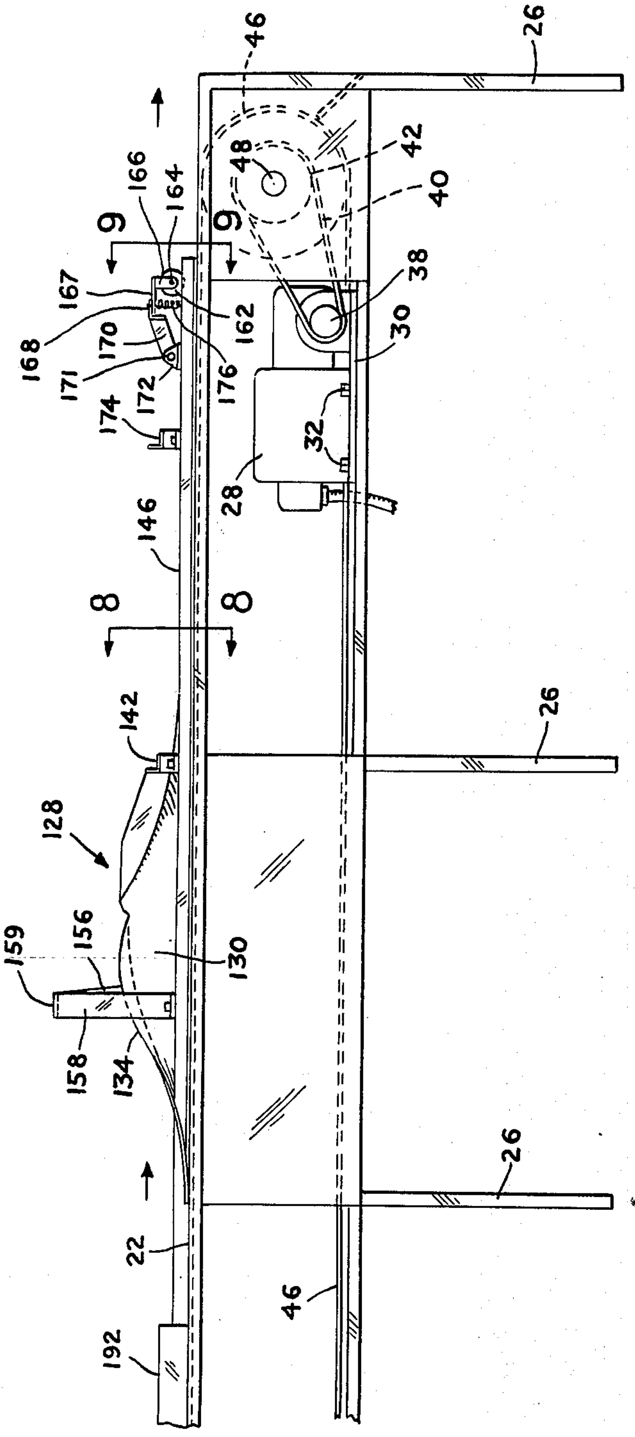
FIG. 5B is an enlarged view of the righthand portion of FIG. 1.
Figure 6B:
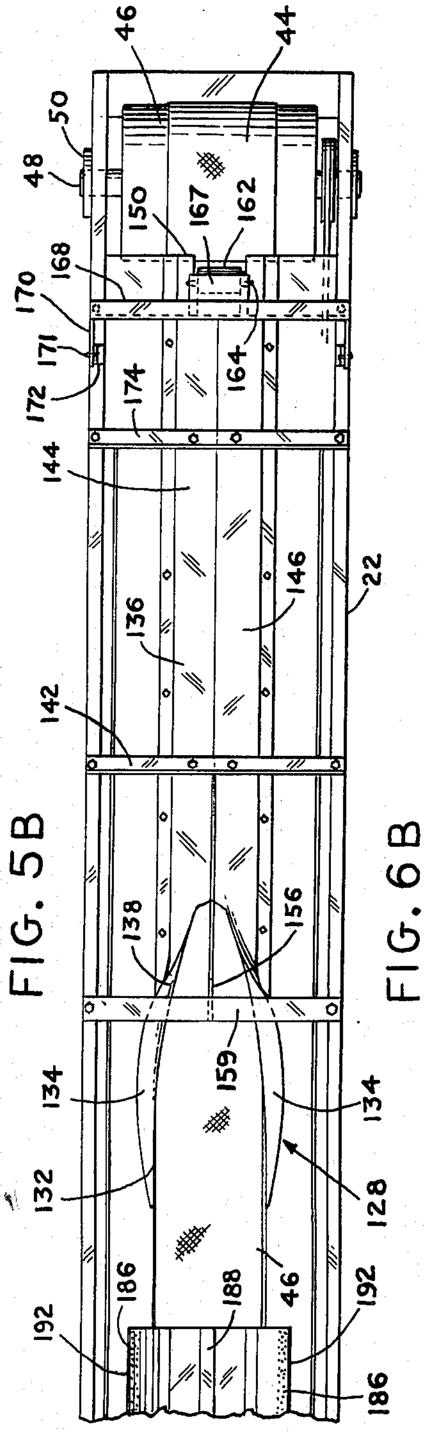
FIG. 6B is an enlarged view of the righthand portion of FIG. 2.

As shown in FIGS. 5A and 6A, a stack of presized cardboard cards or blanks 178 is positioned near the bolster making apparatus and an individual card 180 is placed on the conveyor belt and moved towards the right until it reaches the card positioning means, generally indicated at 62, which consists of two positioning arms 64, one on either side of the table frame, each having a vertical portion 66 extending downward to contact the card and properly position it on the table for further processing. Each positioning arm 64 is pivotally connected to the table frame 22 by pins 70 extending through the positioning arms to ears 72 extending from the frame 22.

The positioning arms have coordinated action under the influence of a spring 80 to center the card in the middle of the table. The spring 80 is connected to the lefthand positioning arm 64 (the upper positioning arm shown in FIG. 6a) by means of line 76 which extends around centering pulley 74 connected to a cross brace, to be described later. The righthand positioning arm (the lowermost arm shown in FIG. 6A) is connected to spring 80 by means of line 78.

In the normal, unflexed position of spring 80, the positioning arms tend to pivot towards each other, thereby blocking passage through their location on the table frame. As the card 180 passes through the positioning arms, the coordinated movement of the arms will force the card to a central position between the arms. Accordingly, variations in the width of card 180 can, therefore, be accommodated by the action of the positioning arms to properly position the card in the central portion of the table frame in preparation for the gluing operation which is next to occur.

As shown in FIGS. 5A and 6A, a gluing means, generally indicated at 82, consists of three glue pots 84 mounted on top of a horizontal cross member 86 supported by side walls 88 extending up from the frame 22. A feed tube 90 extending downwardly from each glue pot is connected to a glue tongue 92 formed from a porous material capable of absorbing liquid glue, which will pass from the glue pot, through the feed tube. At the bottom of the feed tube, just above the glue tongue, are adjusting means consisting of compression blocks 94 positioned on either side of the feed tube, whose distance is controlled by means of thumb screws 96. The compression blocks and thumb screws are mounted on a lower cross brace member 98, previously mentioned, on which is also mounted the idler pulley 74 for the card positioning means. The cross brace 98 on which the compression blocks are mounted acts to anchor and position the location of the gluing tongues and is in turn connected to the side walls 88 of the glue stand by means of bracket portion 100. The flow of glue from the glue pot to the glue tongues is controlled by adjustment of the thumb screw to squeeze off the feed tube until the right amount of glue is fed to the glue tongues for a proper application of glue to the flat card 180 as it passes under the gluing means.

As a card, for example, card 182 shown in FIGS. 5A and 6A, passes from the card positioning means 62 through the gluing station, it is maintained in position by means of position rails 102 to the right of the gluing means which extend from the frame 22 of the apparatus. As the card passes the gluing means, the three gluing tongues will provide three strips of glue on the card, namely two strips of glue 186 at the outer edges of the card and a central strip of glue 184 along the center of the card. After the card has passed the gluing station and before it reaches the scoring station of the apparatus, a central spline 188 is placed on the glued central portion 184 of the card 182.

As the card is moved by the conveyor belt from left to right along the bolster making apparatus, it next comes to the scoring station, generally indicated at 104, which consists of a vertical cross member 106 having a stiffening flange 108 elevated by means of side walls or supports 116 above the height of the table to allow for passage of the card underneath the scoring station. A longitudinal stiffening brace 110 extends centrally along the path of travel of the card, and has mounted on it lower cross braces 112 to which are pivotally mounted vertical scoring arms 118, each arm having two scoring fingers 120 at the lowermost end. Vertical arms 122 (see FIG. 7) extend upward from horizontal foot 114 which in turn is connected to the vertical longitudinal brace 110. The vertical arms 122 act as an anchor for spring 126 which is connected to the rear of the scoring arm 118 to pivot the scoring arm about its pivot connection 124 biasing the arm in the downwardmost or clockwise position.

As can be seen from FIGS. 7A and 7B and 5A, as the card passes under the scoring station, the scoring arm biased in the clockwise position by spring 126 will press the scoring fingers into the cardboard card causing the cardboard card to be deformed, and leaving two sets of symmetrical inner score marks 190 and outer score marks 191 in the card 189. As seen in FIG. 7B, once card 189 has been scored with the score marks 190 and 191, two flaps 192, at the sides of the card, will be formed, which are raised somewhat off the table, due to the deformation of the cardboard by the score marks.

The scored card continues along its path of travel on the conveyor belt until it next comes to the folding station, generally indicated at 128, which consists of a folding member 130, having a leading edge 132 with folding lips 134. The raised flaps 192 of the scored card initially extend above folding lips 134, but as the card progresses to the right, the folding lips sharply rise and thereby force the flaps 192 of the card 189 to rotate toward each other until the card with the folded flaps passes underneath the horizontal section 159 of support frame 158 and enters the compression slope section 136 of the folding member. In the compression slope section, the height of the folded arms will be further reduced until the now folded card is at its final height and is passing through the exit chute 140, which will now be described.

The exit chute, generally indicated as 140, is connected to the folding member outlet and has a cross support 142 to strengthen the top 144 of the chute, in order to assist in the forcing downward of the flaps as the bolster passes through the chute. The sides 146 of the exit chute 140 are dimensioned to the predetermined height or thickness of the bolster (see FIG. 10). The bottom lips of the exit chute 148 form a guide for the bottom of the bolster, to assist in the formation of the bolster, yet have a sufficient space 149 between the ends of the bottom lips to allow for the bottom of the bolster to remain in contact with the conveyor belt so that the bolster can be drawn along to the compression station of the device, which will be described below.

Within the exit chute 140 is positioned aligning finger means 154 for purposes of maintaining the position of the spline 188 (shown in FIG. 10), as the bolster passes through the exit chute and through the compression station.

The aligning finger means shown in FIG. 14 consists of aligning fingers 154 connected to the spline guide support arms 156 which is connected to horizontal section 159 of support frame 158. In addition to supporting the aligning fingers 154, support arm 156 acts to prevent the flaps of the bolster from overlapping during the folding operation and thereby forces the bolster to take the required rectangularly cross-sectioned shape.

The exit chute has an outlet 150 in which a recess or mouth portion 152 is formed to enable operation of the compression device now to be described.

The compression device indicated generally at 160 consists of a compression roller 162, mouted on an axle 164 connected by means of mounting ears 166 to a bracket 167 which, in turn, is connected to a compression roller cross bar 168 having arms 170 pivotally mounted by means of pins 171 and pivot mount 172 (see FIG. 5B and FIG. 9) to the frame 22 of the table. A cross brace 174 is positioned to the left of the compression device to add structural strength to the top of the exit chute.

The compression roller 160 is urged downward by means of compression roller springs 176 which are anchored to the frame 22 of the table on one end and, at the other end, to the compression roller cross bar and, therefore, urge the compression roller 162 into the mouth 152 formed in the top of the exit chute 144 to press down on the flaps of the bolster, pressing them against the spline 188 of the bolster as the bolster is carried by the conveyor belt 58 passed the compression station. As can readily be seen, the outer glued portions of the scored card, as, for example, the glued portion 186 of card 182, shown in FIG. 6A, will be in contact with the top of the spline 188 shown in FIG. 10, and the spline itself will have been in contact with the glued central strip of the card.

Therefore, as the bolster emerges from the compression section, all glued segments or portions of the card will have been contacted and compressed against unglued portions of the bolster to hold the glued portions in contact with the unglued portions to produce the folded, fastened bolster. As shown in FIG. 10, tape 206 can be applied to the ends of the bolster in the final operation, primarily for aesthetic reasons, and also to prevent items from falling into the hollow portions of the bolster.

The bolster, as shown in FIGS. 11 and 12, is of extremely simple and efficient design. It consists essentially of just two pieces, namely a blank card which has been glued, scored and then folded, and a central spline 202 made up of multiple layers 204 of corrugated cardboard of a predetermined thickness to provide both the fastening point for the flaps 200 of the bolster and also to provide a central rigid structural member to insure that the bolster possesses the structural rigidity required for it to adequately perform its function and to insure extended service life. The spline need not be made from multiple layers of cardboard, but can be fabricated from any convenient material such as Styrofoam or wood.

As shown in FIG. 12, the bolster generally indicated at 194 consists of a bottom leaf 196, two sides 198, and two top leaves 200. The top leaves 200 are fastened to the central spline 202 which in turn is glued to the bottom leaf 196 in order to provide basically a hollow structure with only one internal stiffening member, namely the central spline 202. The ends of the bolster are taped, as shown, with tape 206 in order to prevent items from falling into the hollow portion of the bolster and also for aesthetic purposes.

It should be pointed out that since the central spline is relatively wide, the upper leaves 200 of the bolster can be substantially shorter than desired, and still have the bolster function adequately, since any gap between the adjacent edges of the upper leaves 200 will not operatively affect the strength or performance of the bolster.

The bolster produced is relatively light, strong, and resistant to corrosion, bending or tearing. It has been found that results are especially good when corrugated cardboard blanks are used to form the bolster, since use of the corrugated cardboard cards facilitates scoring of the card at the scoring station and the consequent lifting of the flaps to facilitate entrance of the card into the folding station.

The method for producing the bolsters is found to be very efficient because of the simplicity of the steps involved, the sequence in which they are performed, and the ability to constantly observe the more important steps in the method. Additionally, there is a minimum of interaction and sequencing coordination required in the performance of the method for manufacturing the bolsters.

It should also be pointed out that the apparatus for manufacturing the bolsters is extremely simple and relatively easy to make. There are almost no parts in the apparatus which require specific actuation by any sort of control system. Almost all actuation is performed by the card to be processed as it progresses along the process path of the apparatus.

It will be understood that various changes in the details, materials and arrangements of parts which have been herein described and illustrated in order to explain the nature of the invention may be made by those skilled in the art within the principle and scope of the invention, as expressed in the appended claims.

What is claimed is:

1. Apparatus for fabricating bolsters comprising:

means to move a blank sheet along a predetermined path of travel;

means to position a blank sheet with respect to said predetermined path of travel;

means to apply glue to predetermined portions of a blank sheet moving along said path of travel;

means to score patterns on a blank sheet moving along said path of travel;

means to fold a blank sheet which has been scored by said scoring means to form a bolster in accordance with the scored pattern on the blank sheet;

aligning finger means disposed to lie within said bolster formed by said folding means and adapted to hold a spline means therebetween in said bolster as the bolster travels along the path of travel; and means to compress a bolster formed by said folding means to cause glued portions of the sheet forming the bolster to contact other portions of the bolster.

2. The apparatus for fabricating bolsters according to claim 1, wherein said means to position a blank sheet with respect to said predetermined path of travel comprises:

positioning arms pivotally mounted on either side of said path of travel;

means connecting said positioning arms and coordinating movement of said positioning arms with each other; and means biasing said arms to narrow said predetermined path of travel.

3. The apparatus for fabricating bolsters according to claim 1 wherein said means to apply glue to predetermined portions of a blank sheet moving along said path of travel comprise:

glue tongue means adapted to contact a sheet moving along said predetermined path of travel and deposit glue thereon;

glue pot means disposed above said glue tongue means to hold a supply of glue;

feed tube means connecting said glue pot means to said glue tongue means; and control means connected to said feed tube means to control the flow of glue to said glue tongue means.

4. The apparatus for fabricating bolsters according to claim 3, wherein said control means connected to said feed tube means comprises:

compression means disposed about said feed tube means; and screw means adapted to vary the compression of the compression means on said feed tube means.

5. The apparatus for fabricating bolsters according to claim 1 wherein said means to score patterns on a blank sheet passing along said path of travel comprise:

support means disposed above said path of travel;

scoring arm means pivotally connected to said support means;

a plurality of scoring fingers disposed on said scoring arm means; and means biasing said scoring arm means towards said path of travel.

6. The apparatus for fabricating bolsters according to claim 1 wherein said means to fold a blank sheet which has been scored by said scoring means to form a bolster comprise:

inlet lips adapted to lie beneath portions of a scored blank sheet moving on said predetermined path of travel; and said inlet lips shaped to cause portions of a scored blank sheet to fold over upon themselves.

7. The apparatus for fabricating bolsters according to claim 6 wherein said means to fold blank sheets which have been scored by said scoring means to form a bolster further comprise:

compression ramp means adapted to compress folded portions of a scored blank sheet; and means to prevent folded portions of the scored blank sheet from overlapping and interfering with each other during folding of the blank sheet.

8. The apparatus for fabricating bolsters according to claim 1 wherein said means to compress a bolster formed by said folding means to cause glued portions of the sheets forming a bolster to contact other portions of the bolster comprise:

roller means disposed above said predetermined path of travel;
means to pivotally support said roller means; and
means connected to said roller support means to bias said roller toward said path of travel.

9. The apparatus for fabricating bolsters according to claim 1 wherein:
said means to position a blank with respect to said predetermined path of travel comprise:
positioning arms pivotally mounted on either side of said path of travel;
means connecting said positioning arms and coordinating movement of said positioning arms with each other; and
means biasing said arms to narrow said predetermined path of travel;
said means to apply gluing means to predetermined portions of a blank sheet moving along said path of travel comprise:
glue tongue means adapted to contact a sheet moving along said predetermined path of travel;
glue pot means disposed above said glue tongue means to hold a supply of glue;
feed tube means connecting said glue pot means to said glue tongue means; and
control means connected to said feed tube means to control the flow of glue to said glue tongue means comprising:
compression means disposed about said feed tube means; and
screw means adapted to vary the compression of the compression means on said feed tube means;
said means to score patterns on a blank sheet passing along said path of travel comprise:
support means disposed above said path of travel;
scoring arm means pivotally connected to said support means;
a plurality of scoring fingers disposed on said scoring arm means; and
means biasing said scoring arm towards said path of travel;
said means to fold a blank sheet which has been scored by said scoring means to form a bolster comprise:
inlet lips adapted to lie beneath portions of a scored blank sheet moving in said predetermined path of travel;
said inlet lips shaped to cause portions of a scored blank sheet to fold over upon themselves;
compression ramp means adapted to compress folded portions of a scored blank sheet; and
means to prevent folded portions of the scored sheet from overlapping and interfering with each other during folding of the blank sheet; and
said means to compress a bolster formed by said folding means to cause glued portions of the sheets forming a bolster to contact other portions of the bolster comprise:
roller means disposed above said predetermined path of travel;
means to pivotally support said roller means; and
means connected to said roller support means to bias said roller toward said path of travel.

* * * * *